United States Patent
Kelly et al.

(10) Patent No.: US 6,628,329 B1
(45) Date of Patent: Sep. 30, 2003

(54) CORRECTION OF POSITION DEPENDENT BLUR IN A DIGITAL IMAGE

(75) Inventors: Sean C. Kelly, Rochester, NY (US); Donald R. Williams, Williamson, NY (US); David W. Jasinski, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/139,919

(22) Filed: Aug. 26, 1998

(51) Int. Cl.[7] .................. H04N 5/208; H04N 5/20; H04N 17/00; H04N 5/76; G06K 9/40
(52) U.S. Cl. ............ 348/252; 348/255; 348/188; 348/231.6; 382/263
(58) Field of Search .................. 348/248, 252, 348/255, 224.1, 231.3, 231.6, 188; 382/263, 261, 266; 396/319

(56) References Cited

U.S. PATENT DOCUMENTS

| | | | |
|---|---|---|---|
| 4,683,496 A | 7/1987 | Tom | |
| 4,783,840 A | 11/1988 | Song | |
| 4,941,190 A | 7/1990 | Joyce | |
| 4,945,502 A | 7/1990 | Kwon et al. | |
| 4,970,593 A | 11/1990 | Cantrell | |
| 5,241,372 A * | 8/1993 | Ohba | 348/578 |
| 5,461,440 A | 10/1995 | Toyoda et al. | |
| 5,485,534 A | 1/1996 | Takemoto et al. | |
| 5,524,162 A | 6/1996 | Levien | |
| 5,647,027 A | 7/1997 | Burges et al. | |
| 5,696,850 A * | 12/1997 | Parulski et al. | 348/231 |
| 5,867,606 A * | 2/1999 | Tretter | 382/261 |
| 5,913,088 A * | 6/1999 | Moghadam et al. | 396/311 |
| 5,986,701 A * | 11/1999 | Anderson et al. | 348/232 |
| 6,094,511 A * | 7/2000 | Metcalfe et al. | 382/263 |
| 6,097,471 A * | 8/2000 | Buhr et al. | 355/38 |
| 6,097,847 A * | 8/2000 | Inoue | 382/266 |
| 6,173,085 B1 * | 1/2001 | Hamilton, Jr. et al. | 382/263 |
| 6,323,855 B1 * | 11/2001 | Hamilton, Jr. et al. | 345/218 |

FOREIGN PATENT DOCUMENTS

JP 07240841 * 9/1995 .......... H04N/1/409

OTHER PUBLICATIONS

"Image Enhancement vie Adaptive Unsharp Masking", Polesel et al., Mar. 2000, IEEE Transactions on Image Processing, vol. 9, No. 3. pp. 505–510.*
"Image Enhancement and Filtering using Wavelets", Prager et al., IEEE, pp. 169–174.*

* cited by examiner

Primary Examiner—Wendy R. Garber
Assistant Examiner—John M Villecco
(74) Attorney, Agent, or Firm—Pamela R. Crocker

(57) ABSTRACT

Images are sharpened and corrected for position dependent blur by providing a sharpening function which is adapted to operate upon signals corresponding to a selected number of pixels, providing a plurality of values which are a function of the position dependent blur; and applying the plurality of values to the sharpening function to modify the sharpening function so that after the modified sharpening function is applied to the image, a sharpened image will be provided which has been corrected for the position dependent blur.

26 Claims, 7 Drawing Sheets

CORRECTION OF POSITION DEPENDENT BLUR IN A DIGITAL IMAGE

FIELD OF THE INVENTION

The invention relates generally to the field of photography, and in particular to imaging systems producing electronically-derived images that have position dependent blur.

BACKGROUND OF THE INVENTION

An imaging apparatus, such as a photographic camera or an electronic camera, and in particular its optical assembly, have inherent attributes which can degrade the quality of images captured by the device. In certain cases, such as with single use film cameras or inexpensive digital cameras, it may be economically difficult to avoid usage of inexpensive optics. Unfortunately, such optics possess inherent aberrations that degrade the quality of images formed by the optics. Consequently, it is desirable to compensate for these aberrations in the reproduction process so that final images free of aberrations may be obtained.

For example, a camera system described in U.S. Pat. No. 5,461,440 does not require an expensive optical assembly that is corrected for marginal attenuation (light amount irregularity) and distortion (pincushion and barrel distortion). Instead, the curvature of field data and the light amount irregularity data corresponding to the optical assembly is identified in advance, and stored either in the camera or separately at a downstream scanning and processing station. Either way, the data is linked to the specific camera and then used in subsequent film processing and scanning to correct the image signal for the image quality degradation imparted by the optical assembly.

The image quality of digitally produced prints can be further improved by using an appropriate sharpening or "edge enhancement" filter. The appropriate filter depends on the characteristics of the imaging input device (such as a digital camera or a film scanner), the output printer, and the print size. In the prior art, some amount of sharpening is normally performed in the imaging input device, i.e., in the digital camera or the film scanner, and in an output reproduction device, such as a display or a printer. Consequently, it is known for the different parts of the system to have their own sharpening algorithms; in particular, the camera has a hardware sharpening filter, the host computer has user selectable sharpening software, and the printer has a firmware sharpening filter.

The image quality of captured images can be improved by the selection of appropriate filters for the input imaging device and subsequent devices that process the captured images. For instance, in U.S. Pat. No. 4,970,593, the modulation transfer function (MTF) of the uncorrected optical system is measured and an aperture correction function is created from an inverse of the MTF function to correct an image captured through the optical system. Some software packages, such as Adobe Photoshop™, allow the user to select different levels of image sharpening as part of their image processing routines. The amount of sharpening in a printer can sometimes be selected by the user, as can be done in the driver for the Kodak XL7700™ printer, which allows five preset choices of sharpening.

In a typical camera, the image formed at a focal plane (where the film or image sensor is located) can be blurred as a function of proximity to the optical axis of the optical assembly. The further away from the optical axis (normally, the center of the image), the more the image is blurred. The resultant image therefore has an MTF that is a function of radial distance from the center of the image. The problem is exaggerated with images originating from inexpensive cameras, such as single use film cameras. Because of their simple optics or because the film may not be located in the position of best focus throughout the focal plane, single use film cameras tend to have significant sharpness loss with movement away from the optical axis toward the edges of the frame. An optical printing process cannot help the situation, and may instead worsen the situation by introducing the sharpness fall-off of its own optical system.

Especially if they are intended for consumer use, digital cameras, which are inherently more complex and expensive than single use film cameras, must control cost in any way possible. The camera optics is a typical candidate for cost reduction, and position-dependent blurring thus becomes a concern. Despite such image quality concerns, it is usually desirable to provide a finished image file that is corrected for camera-related influences. What is needed is a simple correction for sharpness fall-off that does not require a more complex, or more expensive, optical system, as well as a correction that can be implemented in the processor of a digital camera, or in the downstream scanning and processing of a film system.

In commonly-assigned U.S. Pat. No. 5,696,850, a digital image is produced by a digital camera. This image is operated upon to provide an improved image. This is accomplished by using a sharpening filter which is produced as a function of the system MTF. Although this arrangement produces an improved image, there are still problems with image quality. For example, the image can still suffer from position dependent blur.

SUMMARY OF THE INVENTION

An object of the present invention is to provide an improved digital image that eliminates the problems noted above.

Another object of the invention is to provide a modified sharpening kernel which not only sharpens the image, but also corrects for position dependent blur.

These objects are achieved by a method for providing a modified sharpening function which can be used to provide an improved sharpened image from an image having a plurality of pixels by correcting for position dependent blur, comprising the steps of:

(a) providing a sharpening function which is adapted to operate upon signals corresponding to a selected number of pixels;

(b) providing a plurality of values which are a function of the position dependent blur; and (c) applying the plurality of values to the sharpening function to modify the sharpening function so that after the modified sharpening function is applied to the image, a sharpened image will be provided which has been corrected for the position dependent blur.

An advantage of the present invention is to correct for position dependent blur of image data which can be caused by lens or image sensor phenomena, such as charge-transfer inefficiency, thereby providing improved image quality. The present invention is particularly suitable for use with not only electronic cameras, but can also be used with conventional photographic cameras. It makes use of digital image processing and provides a boost map for modifying a sharpening kernel. This reduces processing steps and provides an effective way for improving image quality.

DETAILED DESCRIPTION OF THE INVENTION

Figure 1:
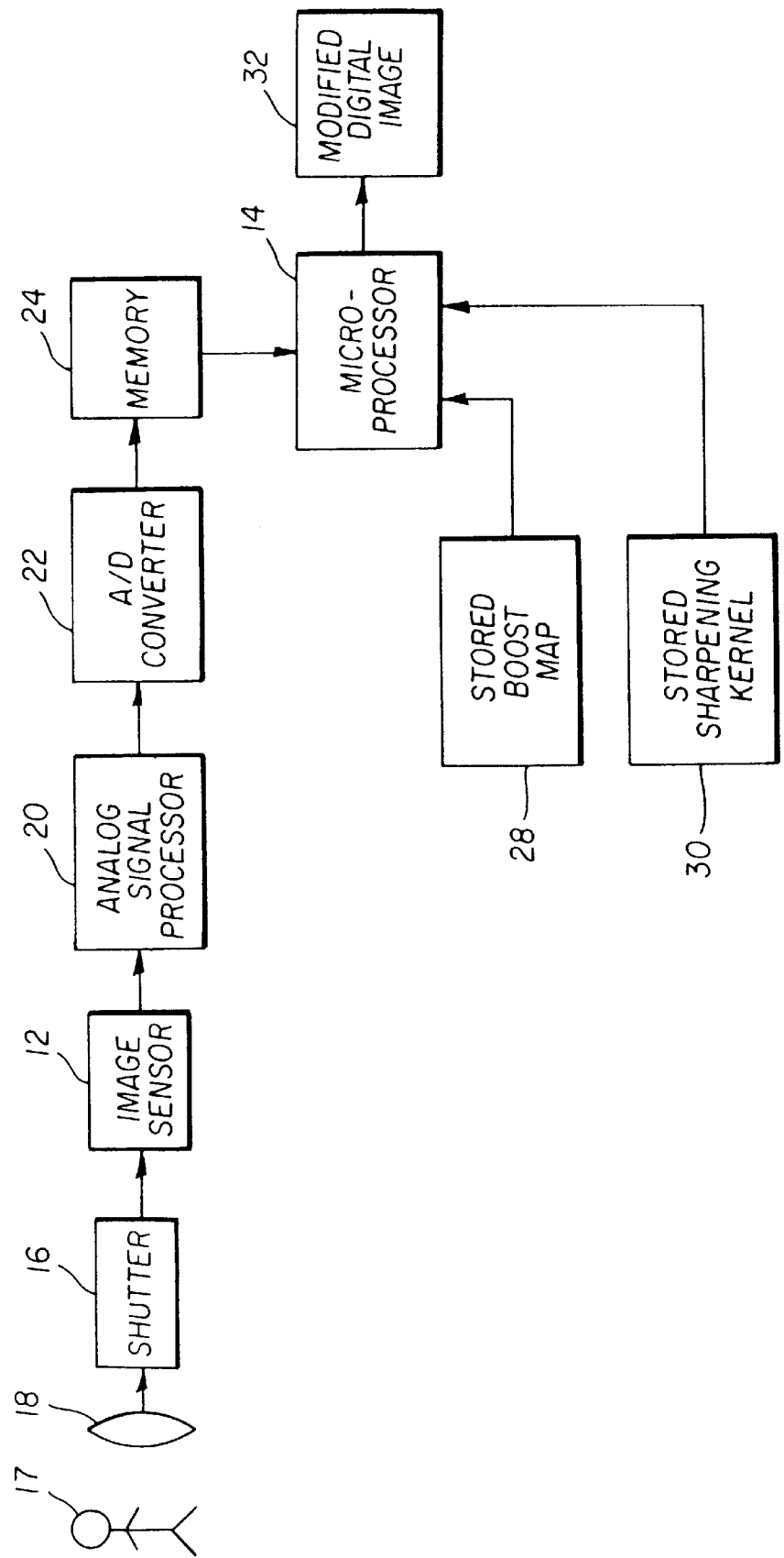
FIG. 1 is a block diagram showing the general arrangement for modifying a sharpening kernel by applying a boost map to the sharpening kernel in accordance with the present invention.

Because imaging devices employing photographic film and electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described are provided in software. Given the system description as described in the following materials, all such software implementation is conventional and within the ordinary skill in such arts.

One of the most important characteristics of an electronic imaging system is the ability of its imaging device to capture fine detail found in an original scene. This ability to resolve detail is determined by a number of factors, including the performance of the optical system, the number of addressable photo elements in the optical imaging device, and the electrical circuits in the camera or scanner, which may include image compression and gamma correction functions. Different measurement methods can provide different metrics to quantify the resolution of an imaging system, or a component of an imaging system, such as a lens. Resolution measurement metrics include resolving power, limiting resolution (at some specified contrast), modulation transfer function (MTF), and optical transfer function (OTF). Mathematically, the MTF is the modulus of the OTF, which is the two-dimensional Fourier transform of the point spread function of the imaging system under consideration. The OTF is a complex function whose modulus (MTF) has the value unity at zero spatial frequency. Although the focus in this application is on use of the MTF to characterize the resolution of the optical system, other metrics could be used, for example the OTF, spatial frequency response or depth of modulation level at various spatial frequencies. These are all various forms of spatial transfer functions that can be used to characterize the sharpness of an image from an imaging device.

The advantage of the spatial transfer functions is that they provide information about image quality over a range of frequencies rather than just at the limiting frequency as does resolving power. More particularly, the MTF is a graph (i.e., a set of discrete modulation factors) that represents the image contrast relative to the object contrast on the vertical axis over a range of spatial frequencies on the horizontal axis, where high frequency corresponds to small detail in an object. If it were possible to produce a facsimile image, the contrast of the image would be the same as the contrast of the object at all frequencies, and the MTF would be a straight horizontal line at a level of 1.0. In practice, the lines always slope downward to the right, since image contrast decreases as the spatial frequency increases. Eventually the lines reach the baseline, representing zero contrast, when the image-forming system is no longer able to detect the luminance variations in the object.

Optical devices and systems, such as lenses, electronic image sensors, and the like, all have a response to spatial frequency denoted by their spatial response functions, such as their MTF curves. Thus, the MTF can be determined for each component in an image-forming system or for combinations of components. The MTF for a system can be calculated by multiplying the modulation factors of the components at each spatial frequency. The system MTF will be a function of the MTF of the optical components (i.e., the lens and the blur filter), and MTF degradation associated with the electronic acquisition and processing components (i.e., image sensor charge transfer inefficiencies). Since the MTF curves of all of the devices in a system are multiplied together point by point to provide the system MTF curve, the system curve is also a downwardly sloping function diminishing to zero resolution as the spatial frequency increases. This downwardly sloping characteristic results in a gradual loss of contrast in the detail of the image as the detail becomes finer and finer. For example, all optical devices have a non-ideal MTF response curve because of the finite size of the optical aperture associated therewith. The MTF curve of such optical devices is normally a monotonically decreasing function such as a downwardly sloping diagonal line, i.e., a set of diminishing modulation factors, that intersects the spatial frequency axis at a point of frequency less than or equal to the diffraction limit—the point at which contrast or resolution diminishes to zero. A filter can be designed with a transfer function to compensate for the diffraction effects of the finite size of the optical aperture of the system. If the filter curve is the inverse of the system MTF curve, the composite curve will be substantially flat out to the diffraction limit. The filter thus boosts the high spatial frequency contrast to compensate for the downwardly sloping characteristic of the system MTF. For a more complete description of a sharpening filter which is a function of system MTF, see commonly-assigned U.S. Pat. No. 5,696,850, the disclosure of which is herein incorporated by reference.

In a camera, the image formed at the focal plane (i.e., on a photosensitive film or on a photosensitive array (e.g., a CCD)) is typically blurred as a function of proximity to the optical axis. The further away from the center of the image, the more the image is blurred. The resultant image therefore has an MTF which is a function of radial distance from the center of the image. Furthermore, an image can also possess blur due to mechanisms like image sensor charge transfer inefficiency. Sensor based mechanisms will, in general, have different symmetry than the described lens mechanism, but are also correctable. In either case, the blur will be hereinafter referred to as "position dependent blur."

Turning now to FIG. 1, a generalized schematic for the operation of a system which can be used in accordance with the present invention is shown. The system includes an image sensor 12 which includes a two-dimensional array of photosites corresponding to picture elements (pixels) of the image. The image sensor 12 can be a conventional charge-coupled device (CCD) using either well known interline transfer or frame transfer techniques, or a complementary metal oxide semiconductor (CMOS) imager. An image is captured under the control of a microprocessor 14 which causes a shutter 16 to open and an image of a subject 17 is applied by a lens 18 to the image sensor 12. When the image sensor 12 is exposed to the image light, analog image charge is produced in respective photosites. After the shutter 16 is closed, the charge information produced by the image sensor 12 is applied to an analog signal processor 20. The analog signal processor 20 controls the read-out clocking of the image sensor 12 and converts the charge information to analog image signals corresponding to respective picture elements. The analog image signals from the analog signal processor 20 are applied to an analog to digital (A/D) converter 22, which produces a digital image signal from the analog input signal for each picture element. The captured digital image signals are stored in memory 24.

The image captured by the image sensor 12 has position dependent blur which is a function of the system MTF. In accordance with the present invention, a boost map 28 is created which is a plurality of values which are a function of the position dependent blur of the captured image, and which can be applied to a stored sharpening function, such as a stored sharpening kernel 30. As shown in FIG. 1, the microprocessor 14 receives the stored boost map 28 and the stored sharpening kernel 30, and modifies the stored sharpening kernel 30 in response to the boost map 28. In particular, the boost map 28 varies the boost strength of the stored sharpening kernel 30 so as to spatially compensate for the local value of the system MTF and correct for the position dependent blur of the captured image. The microprocessor 14 applies the modified sharpening kernel 30 to the digital image, and a modified image 32 is produced which is sharpened and corrected for position dependent blur.

Figure 2:
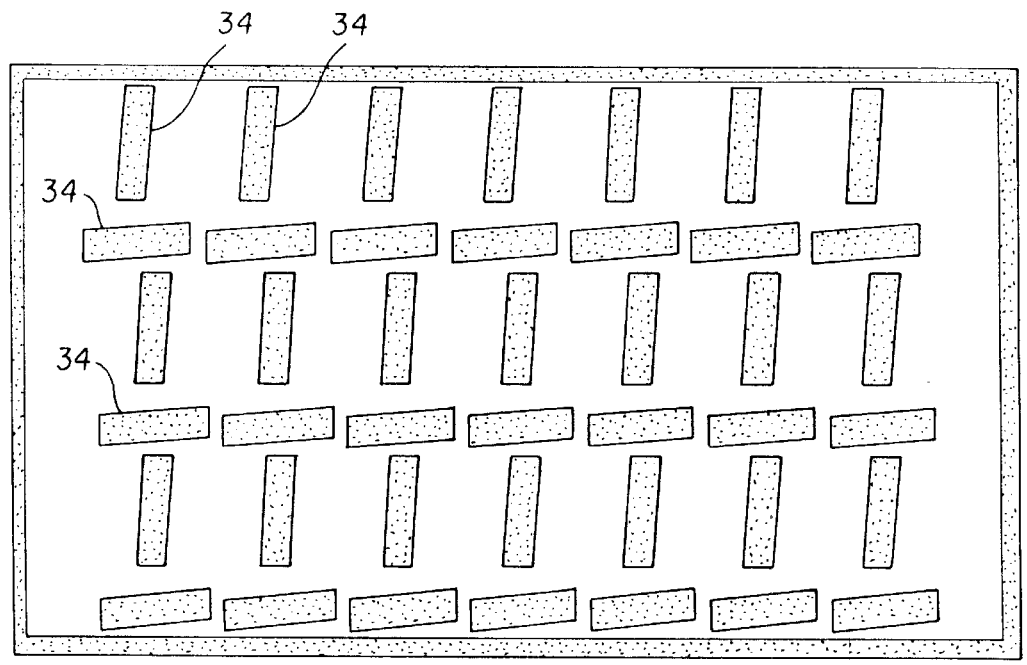
FIG. 2 is a diagram of an exemplary test target having multiple edges which can be used to determine the system MTF.

Implementation of the sharpening kernel 30 can take the form of an unsharp masking approach or a direct convolution in a manner well known to those skilled in the art. To create the boost map 28, the camera manufacturer first characterizes the MTF of a film camera or an electronic camera and the associated processing components, and determines the local value of the system MTF. The local value of the system MTF for an electronic camera is a function of the MTF of the optical components (i.e., the lens and the blur filter), and as well as MTF degradation associated with the electronic acquisition and processing components, such as image sensor charge transfer inefficiencies. It will be appreciated that with film cameras, the system MTF is a function of the MTF of the optical components, as well as blur caused by mispositioning of the film relative to the focal plane. A preferred method of measuring the system MTF is to utilize an oversampled edge technique to measure the MTF at various locations in the image. An example of such an oversampled edge technique is described in ISO 12233—"Photography—Electronic Still Picture Cameras—Resolution Measurements." When this ISO technique is used, it is preferably used with a test target that is imaged by the camera. FIG. 2 shows an example of a test target having multiple edges 34. Each edge 34 can be used to determine the Mm of the imaging system at the location of the edge 34. For a more detailed description of MTF measurement, see commonly-assigned U.S. Pat. No. 5,696,850, and commonly-assigned U.S. patent application Ser. No. 09/007,856, filed Jan. 15, 1998, the disclosures of which is herein incorporated by reference.

The camera manufacturer then develops the boost map 28 as an array of position dependent gain factors (boost values) stored in a two-dimensional look-up table which scale the coefficients of the sharpening kernel 30 on a pixel-by-pixel basis in response to the local value of the system MTF in order to correct for the position dependent blur of the captured image. For each pixel of the captured image, the boost map 28 includes a corresponding boost value. The stored boost map 28 may have a similar number of array values as the image sensor 12, or may have a reduced number of values (for example, $\frac{1}{16}$ as many rows and $\frac{1}{16}$ as many columns) which are repeated or bilinearly interpolated, for example, to provide the boost factors for each pixel. Alternatively, the boost map 28 can be defined by a two-dimensional polynomial equation representing the gain required to obtain desired local values of the system MTF. Since the MTF is a slowly varying function of position, a two-dimensional polynomial equation will generally suffice rather than a memory intensive multidimensional lookup table.

Figure 3A:
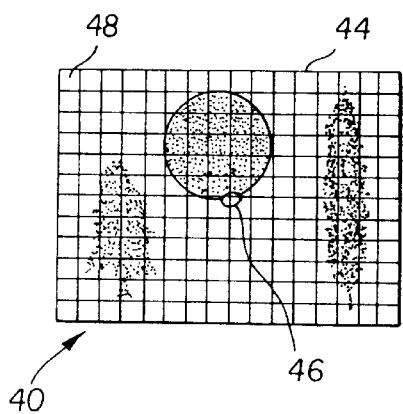
FIGS. 3A and 3B show examples of a digital image and a corresponding boost map, respectively.
Figure 3B:
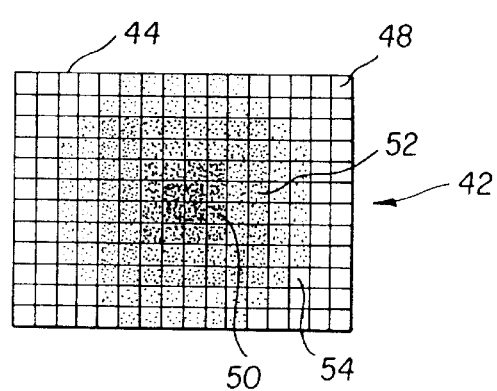

FIGS. 3A and 3B show an exemplary image 40 having position dependent blur and an exemplary boost map 42, respectively, each within a grid pattern 44 illustrating pixels 48 of the image field relative to an optical center 46. The pixels 48 of the boost map 42 are lightened in proportion to the amount of boost that is prescribed (the more boost, the lighter the illustrated pixel). As shown in FIG. 3B, pixel 52 is lighter than pixel 50, so pixel 52 receives a larger boost strength than pixel 50. Likewise, pixel 54 is lighter than pixel 52, so pixel 54 receives a larger boost strength than pixel 52 and pixel 50.

Figure 4:
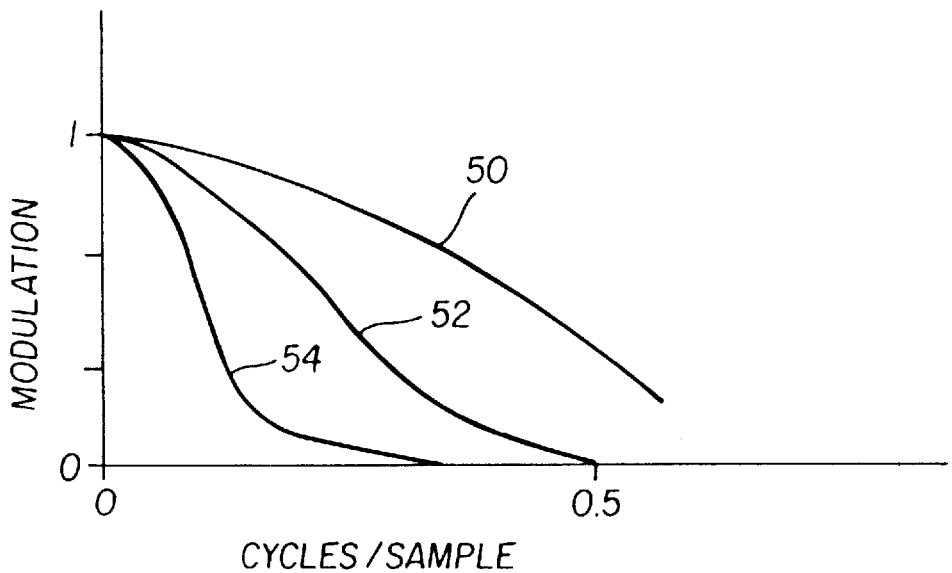
FIG. 4 is a graph of position dependent MTF values for three exemplary positions of the digital image of FIG. 3A.

To create the boost map 42 in accordance with the present invention, the ISO oversampled edge technique can be applied to the captured image to obtain local values of system MTF at specific locations (e.g., at fifteen pixel locations). FIG. 4 shows position dependent MTF values for pixels 50, 52, and 54 of the image 40 of FIG. 3A. Pixel 50 is located at the optical center 46 of the image 40. A desired MTF is determined from the measured local values, and can be represented, for example, by the MTF value at the Nyquist frequency (i.e., 0.5 cycles/sample) at the pixel of the image 40 having a desired sharpness. Typically, the desired MTF occurs at the center of the image, as shown in FIG. 3A. A boost value at each of the pixels of the image is then computed by the following equation:

$$\text{Boost value} = MTF(F)_{desired}/MTF(F)_{x,y} \qquad (1)$$

where $MTF(F)_{desired}$ is the MTF value at an appropriate frequency (e.g. at one-half the Nyquist frequency) at the position of the image having the desired sharpness (the "desired MTF"), and $MTF(NQ)_{x,y}$ is the MTF value at the Nyquist frequency at the measured region (Pixel x,y). The other values in the boost map 42 can be produced by fitting a two-dimensional polynomial equation to the computed boost values for all pixel locations. The boost map 42 is then applied to the sharpening kernel at each pixel of the captured image 40 to scale the MTF of the sharpening kernel in response to the desired MTF in order to correct for position dependent blur of the captured image 40.

Figure 5:
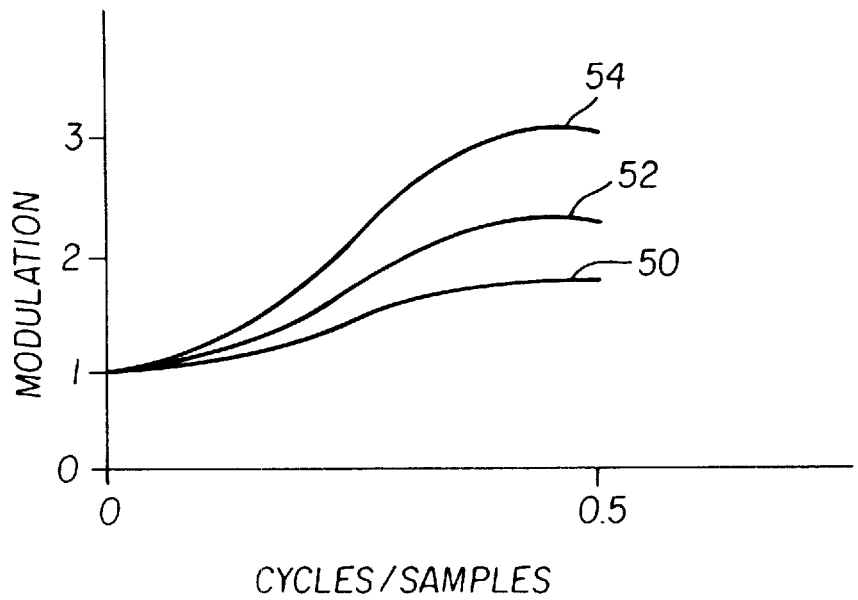
FIG. 5 is a graph of the scaled MTF of a sharpening kernel for the three positions of FIG. 4 after a boost map has been applied to the sharpening kernel in accordance with the present invention.

FIG. 5 qualitatively shows the scaled MTF of the sharpening kernel for pixels 50, 52, and 54 of the image 40 of FIG. 3A. As shown in FIG. 5, pixel 54 receives a larger boost than pixel 52, and pixel 50 requires a minimum amount of boost since the sharpness of pixel 50 has minimum degradation.

Figure 6:
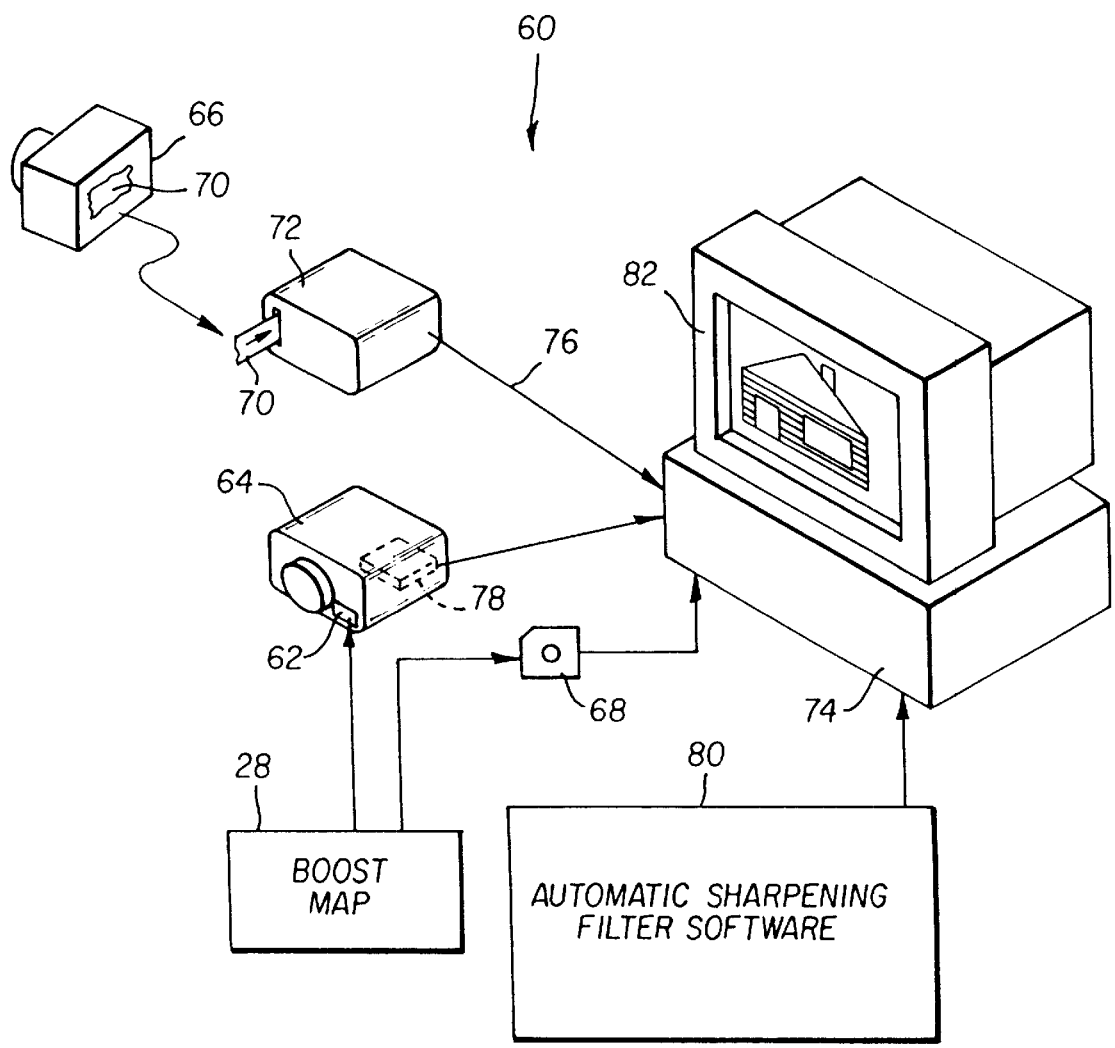
FIG. 6 is a diagram of an imaging system utilizing the present invention.

A diagram of a system 60 utilizing the present invention is shown in FIG. 6. As previously described, the camera manufacturer develops a boost map 28 to compensate for the local value of the system MTF and records the boost map 28 in a memory device 62 in an electronic camera 64, or in a computer file 68 supplied with the electronic camera 64 or a film camera 66. A typical computer file 68 would be a floppy magnetic disk with the boost map 28 stored thereon along with program code for enabling an external device to access the boost map 28. Both the camera 64 or 66, and the disk 68 would be supplied together as a kit by the manufacturer to the purchaser. The memory device 62 could be, e.g., a programmable read-only memory (PROM) that is readable by the camera's internal processor (not shown). The electronic camera 64 could include the boost map 28 with the captured image file and the film camera 66 could record the boost map 28 on a magnetic region of a film 70. The film camera 66 exposes the film 70, which is then developed, and scanned by a scanner 72. The digital signals from the scanner 72 or the electronic camera 64 are then input to a host computer 74 via a cable connection 76 or a memory card 78.

The host computer 74 contains automatic sharpening filter software 80, stored in conventional program memory, which includes a sharpening algorithm. The sharpening software 80 applies the boost map 28 to the sharpening algorithm to create a modified sharpening kernel which sharpens the captured image and corrects for the position dependent blur. The modified sharpening kernel is then applied to the image data to sharpen the image generated by a display 82 or produced by a printer (not shown). Alternatively, the sharpening software 80 could be in the scanner 72 or the electronic camera 64. The processor in the scanner 72 or electronic camera 64 would then apply the boost map 28 to the sharpening algorithm in order to correct for position dependent blur of the captured image, and thereby produce finished image files that incorporate the sharpness corrections.

Figure 7:
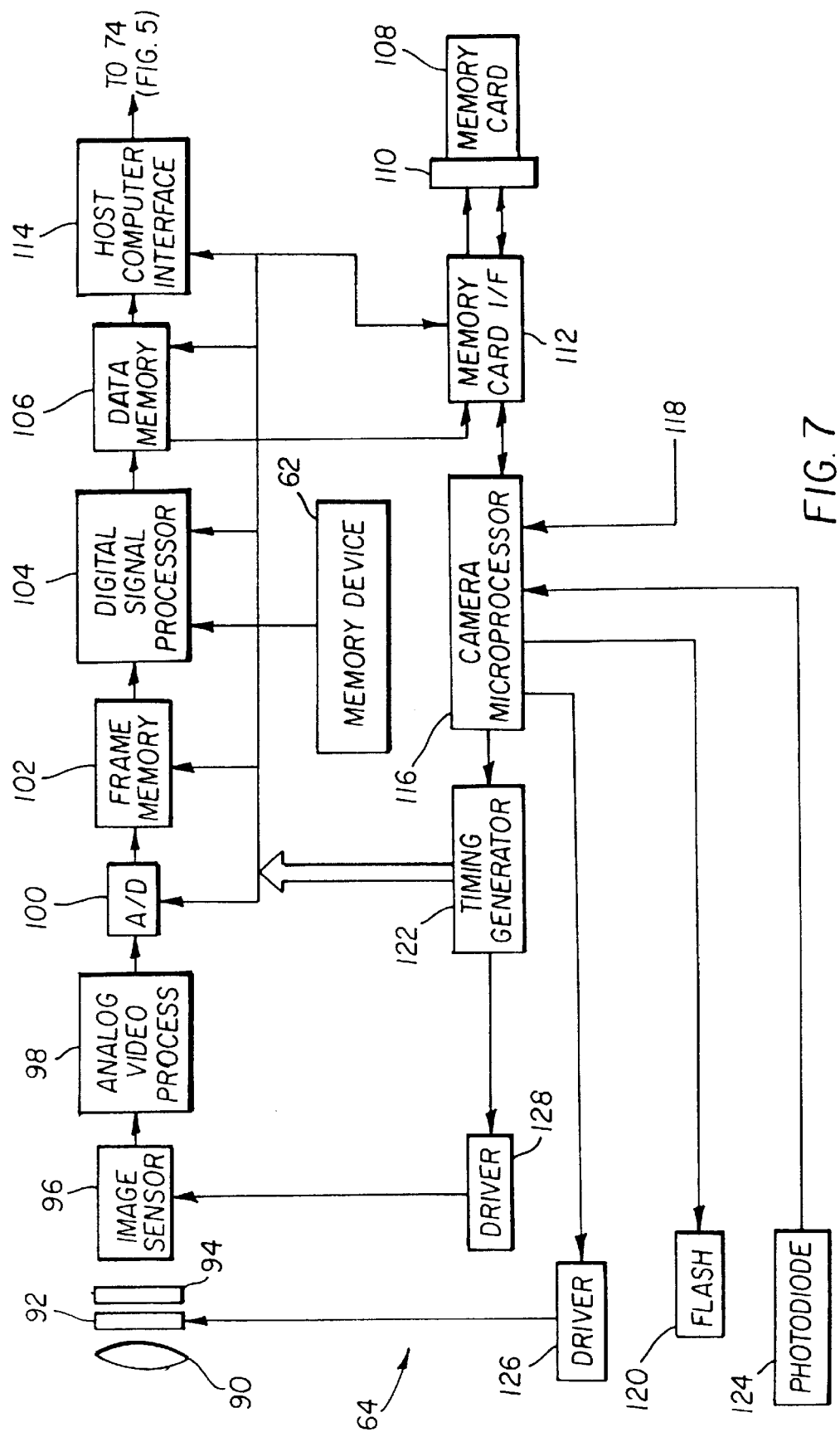
FIG. 7 is a more detailed block diagram of a digital camera shown in the system of FIG. 6 wherein the structure for modifying the sharpening kernel is within the digital camera.

FIG. 7 shows a block diagram of an exemplary embodiment of the electronic camera 64 which shows the present invention in more detail than the block diagram in FIG. 1. A lens 90 directs image light from a subject (not shown) through an aperture/shutter controller 92 and a blur filter 94 upon an image sensor 96, which is preferably a charge coupled device (CCD) sensor. The sensor 96 generates an image signal that is processed by an analog video processor 98 before being converted into a digital image signal by an analog to digital (A/D) converter 100. The digitized image signal is temporarily stored in a frame memory 102, and then processed and compressed by a digital signal processor 104. The compressed image signal is then stored in a data memory 106 or, if a memory card 108 is present in a memory card slot 110 of the electronic camera 64, transferred through a memory card interface 112 to the memory card 108. In this embodiment, the memory card 108 is adapted to the PCMCIA card interface standard, such as described in the *PC Card Standard, Release* 2.0, published by the Personal Computer Memory Card International Association, Sunnyvale, Calif., September, 1991.

Electrical connection between the memory card 108 and the electronic camera 64 is maintained through a card connector (not shown) positioned in the memory card slot 110. The memory card interface 112 and the card connector provide, e.g., an interface according to the aforementioned PCMCIA card interface standard. The compressed image signal may also be sent to the host computer 74 (see FIG. 6), which is connected to the electronic camera 64 through a host computer interface 114. A camera microprocessor 116 receives user inputs 118, such as from a shutter release, and initiates a capture sequence by triggering a flash unit 120 (if needed) and signaling a timing generator 122. The timing generator 122 is connected generally to the elements of the electronic camera 64, as shown in FIG. 7, for controlling the digital conversion, compression, and storage of the image signal. The microprocessor 116 also processes a signal from a photodiode 124 for determining a proper exposure, and accordingly signals an exposure driver 126 for setting the aperture and shutter speed via the aperture/shutter controller 92. The CCD sensor 96 is then driven from the timing generator 122 via a sensor driver 128 to produce the image signal.

Figure 8:
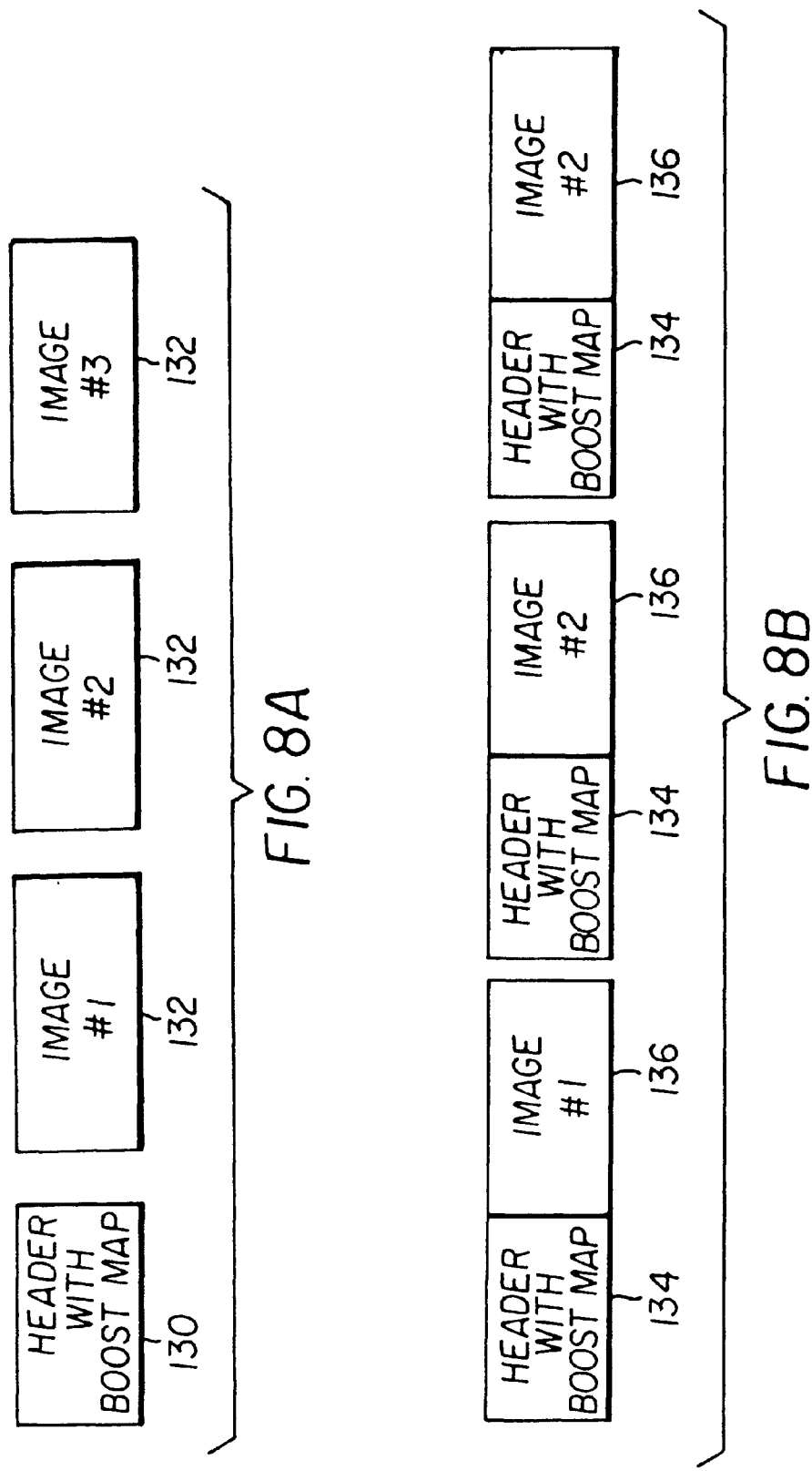
FIGS. 8A and 8B are examples of data structures which include a boost map and at least one image in accordance with the present invention.

The boost map 28 is contained either in the memory device 62 (i.e., camera PROM), which is connected to the digital signal processor 104, or in the computer file 68 (see FIG. 6). Typically, the boost map 28 would characterize the optical system comprising the lens 90, the blur filter 94, the image sensor 96, and any other elements in the optical chain, such as infrared filters, color filter arrays, or the like. If the boost map 28 is in the electronic camera 64, the PROM 62 contains the boost map 28 which is supplied with the image data to the host computer 74. FIGS. 8A and 8B show two examples of data structures that can be used to transfer the boost map 28 and the image data to the host computer 74. In FIG. 8A, the digital signal processor 104 writes the boost map data into a camera header 130, followed by individual image trailer records 132. In FIG. 8B, the boost map data is written into individual camera headers 134 together with individual image trailer records 136. Alternatively, the boost map 28 can be contained in the computer file 68 (instead of in the PROM 62) shown in FIG. 6, which is provided as a floppy disk or the like in combination with the camera 64. The boost map 28 is then accessed by the host computer 74 through a conventional disk drive interface (not shown) when the user loads the disk into the interface. In an alternative embodiment, the digital signal processor 104 can perform the sharpening function, so that the images stored in the data memory 106 or the memory card 108 are corrected for the position dependent blur.

Figure 9:
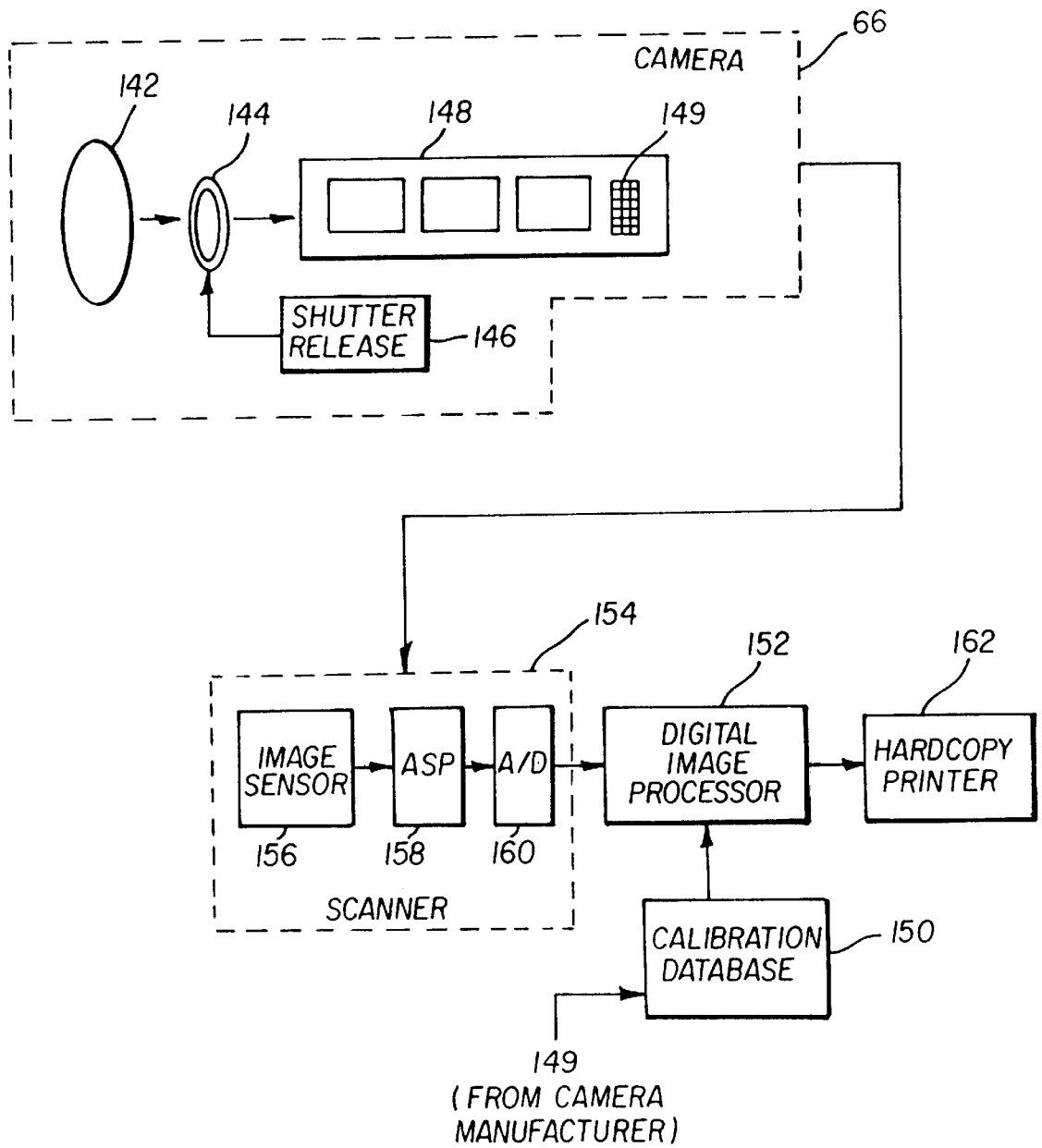
FIG. 9 is a flow diagram for the operation of the system of FIG. 6 and also a block diagram of the film camera shown in the system of FIG. 6.

FIG. 9 shows a flow diagram of the operation of the system of FIG. 6 and also a block diagram of an exemplary embodiment of the film camera 66, and in particular, a single use camera. The single use camera 66 includes an inexpensive lens 142 which suffers from position dependent MTF variations. The single use camera 66 further includes an aperture/shutter 144 which is controlled by a shutter release button 146, prepackaged photographic film 148, and a film advance mechanism (not shown). The film advance mechanism is typically a thumb actuated film advance wheel or manual thumbwheel which moves the filmstrip one image frame at a time. In operation, a camera user exposes one frame of the photographic film 148 by pressing the shutter release button 146. When the shutter release button 146 is actuated, the aperture/shutter 144 opens momentarily and light from a subject (not shown) is directed by the lens 142 onto the photographic film 148 at an exposure gate (not shown). After each frame exposure, the user rotates the film advance mechanism to advance the photographic film 148 the equivalent of one image frame.

In accordance with the present invention, the position dependent MTF of the lens 142 is measured by the camera manufacturer and stored as a code that is accessible during processing of the photographic film 148 to correct for the position dependent blur of the image. If the single use camera 66 utilizes APS film which includes a magnetic coating, the magnetic coating can be coded during manufacturing with codes that indicate the position dependent MTF characteristics. Alternatively, a camera identification code 149 can be recorded on a leading end ("film leader") of the film 148 that references a calibration database 150 to all photofinishing units. The codes indicating the camera identification or the camera position dependent MTF characteristics are supplied to the calibration database 150. The calibration database 150 provides the boost map 28 to a digital image processor 152.

When the photographic film 148 is fully exposed, the single use camera 66 is sent to a photofinisher who develops the photographic film 148 and scans it using a scanner 154. The scanner 154 includes an image sensor 156, an analog signal processor 158 and an analog to digital (A/D) converter 160. The image sensor 156 generates an image signal that is processed by the analog signal processor (ASP) 158 before being converted into a digital image signal by the analog to digital (A/D) converter 160. The boost map 28 for the type of camera indicated by the camera identification code 149 is applied to a sharpening kernel in the digital image processor 152 in a manner previously described in conjunction with FIGS. 5 and 6 to produce a modified sharpening kernel. The modified sharpening kernel is then applied to the digital image signal in the digital image processor 152. This provides a sharpened digital image signal which is also corrected for position dependent blur. The corrected digital image signal output from the digital image processor 152 is then printed using a hardcopy printer 162 or provided as an electronic file (not shown) for viewing or printing by the customer. Alternatively, the sharpening algorithm could be in the host computer 74 shown in FIG. 6.

Computer programs or software for providing the sharpening kernel 30 and the boost map 28 (shown in FIGS. 5 and 6), and for applying the boost map 28 to the sharpening kernel 30 to modify the sharpening kernel 30 in accordance with the present invention can be stored on a computer readable medium. The computer readable storage medium may comprise, for example, magnetic storage medium such as a magnetic disc (i.e., a floppy disc) or magnetic tape; optical storage media such as an optical disc, optical tape, or machine readable bar code; solid state electronic storage devices such as random access memory (RAM) or read only memory (ROM); or any other physical device or medium employed to store a computer program.

The invention has been described with reference to a preferred embodiment. However, it will be appreciated that variations and modifications can be effected by a person of ordinary skill in the art without departing from the scope of the invention.

Parts List 12 image sensor
14 microprocessor
16 shutter
17 photographic subject
18 lens
20 analog signal processor
22 analog-to-digital converter
24 memory
28 stored boost map
30 stored sharpening kernel
32 modified digital image
34 edge
40 image
42 boost map
44 grid pattern
46 optical center
48 pixel
50 pixel
52 pixel
54 pixel
60 system
62 memory device
64 electronic camera
66 film camera
68 computer file
70 film
72 scanner
74 host computer
76 cable connection
78 memory card
80 sharpening filter software
82 display
90 lens
92 aperture/shutter controller
94 blur filter
96 image sensor
98 analog video processor
100 analog-to-digital converter
102 frame memory
104 digital signal processor
106 data memory
108 memory card
110 memory card slot
112 memory card interface
114 host computer interface
116 camera microprocessor
118 user inputs
120 flash unit
122 timing generator
124 photodiode
126 exposure driver
128 sensor driver
130 camera header
132 image trailer record
134 individual camera header
136 individual image trailer record
142 lens
144 aperture/shutter
146 shutter release button
148 photographic film
149 camera identification code
150 calibration database
152 digital image processor
154 scanner
156 image sensor
158 analog signal processor
160 analog to digital converter
162 hardcopy printer

What is claimed is:
1. A method for creating a boost map to correct for position dependent blur in an image, comprising the steps of:
 (a) providing an electronic camera having an imaging system to capture images;
 (b) using the electronic camera to capture an image of a test pattern having multiple edges in a repeated pattern;

(c) measuring the MTF of the imaging system at the position of each edge of the test pattern image;

(d) determining a desired MTF of the imaging system;

(e) calculating a boost value for each edge position based on the corresponding measured MTF value of that position and the desired MTF value; and (f) creating a boost map as a function of two or more of the calculated boost values, the boost map including a plurality of position dependent gain values to be applied to subsequent images captured by the electronic camera in order to correct for position dependent blur in the captured images, such that for each pixel of the captured image, the boost map includes a corresponding position dependent gain value.

2. The method according to claim 1 wherein the test pattern includes horizontal and vertical edges.

3. The method according to claim 1 wherein the step of creating the boost map includes fitting the two or more calculated boost values into a two-dimensional polynomial equation representing the gain required to correct for position dependent blur at each position in a captured image.

4. The method according to claim 3 wherein all of the calculated boost values are fitted into the two-dimensional polynomial equation.

5. The method according to claim 1 wherein the step of creating the boost map includes interpolation to produce the plurality of position dependent gain values.

6. The method according to claim 1 wherein the step of creating the boost map includes defining a region surrounding each edge position of the test pattern image, and repeating the calculated boost value for each corresponding region to produce the plurality of position dependent gain values.

7. A method for providing an improved sharpened image from an image having position dependent blur, comprising the steps of:

(a) providing an electronic camera having an imaging system to capture images;

(b) using the electronic camera to capture an image of a test pattern having multiple edges in a repeated pattern;

(c) measuring the MTF of the imaging system at the position of each edge of the test pattern image;

(d) determining a desired MTF of the imaging system;

(e) calculating a boost value for each edge position based on the corresponding measured MTF value of that position and the desired MTF value;

(f) creating a boost map as a function of two or more of the calculated boost values, the boost map including a plurality of position dependent gain values to be applied to subsequent images captured by the electronic camera in order to correct for position dependent blur in the captured images, such that for each pixel of the captured image, the boost map includes a corresponding position dependent gain value;

(g) providing a sharpening function which is adapted to operate upon the captured image; and (h) applying the plurality of position dependent gain values in the boost map to the sharpening function to modify the sharpening function corresponding to different positions of the captured image, so that a sharpened image is provided which has been corrected for the position dependent blur.

8. The method according to claim 7 wherein the sharpening function has the form of a sharpening kernel.

9. The method according to claim 7 wherein the test pattern includes horizontal and vertical edges.

10. The method according to claim 7 wherein the step of creating the boost map includes fitting the two or more calculated boost values into a two-dimensional polynomial equation representing the gain required to correct for position dependent blur at each position in a captured image.

11. The method according to claim 10 wherein all of the calculated boost values are fitted into the two-dimensional polynomial equation.

12. The method according to claim 7 wherein the step of creating the boost map includes interpolation to produce the plurality of position dependent gain values.

13. The method according to claim 7 wherein the step of creating the boost map includes defining a region surrounding each edge position of the test pattern image, and repeating the calculated boost value for each corresponding region to produce the plurality of position dependent gain values.

14. Imaging apparatus for capturing images on a light-sensitive medium and for processing the captured images to correct for position dependent blur, the imaging system comprising:

(a) an imaging section for capturing an image on the light-sensitive medium and producing image data, the capturing means possessing one or more attributes that cause position dependent blur of the captured image;

(b) means for capturing at image of a test pattern having multiple edges in a repeating pattern, and including means for measuring the MTF of the imaging system at the position of each edge of the test pattern;

(c) means for determining a desired MTF of the imaging system;

(d) means for calculating a boost value for each edge position based on the corresponding measured MTF value of that position and the desired MTF value;

(e) means for creating a boost map as a function of two or more of the calculated boost values, the boost map including a plurality of position dependent gain values to be applied to subsequent images captured by the electronic camera in order to correct for position dependent blur in the captured images, such that for each pixel of the captured image, the boost map includes a corresponding position dependent gain value; and (f) processing means including a sharpening function which is adapted to operate upon the captured image and means for applying the plurality of position dependent gain values in the boost map to the sharpening function to modify the sharpening function corresponding to different positions of the captured image, so that a sharpened image is provided which has been corrected for the position dependent blur.

15. The imaging apparatus according to claim 14 wherein the sharpening function has the form of a sharpening kernel.

16. The imaging apparatus according to claim 14 wherein the test pattern includes horizontal and vertical edges.

17. The imaging apparatus according to claim 14 wherein the means for creating the boost map includes fitting the two or more calculated boost values into a two-dimensional polynomial equation representing the gain required to correct for position dependent blur at each position in a captured image.

18. The imaging apparatus according to claim 17 wherein all of the calculated boost values are fitted into the two-dimensional polynomial equation.

19. The imaging apparatus according to claim 14 wherein the means for creating the boost map includes interpolating to produce the plurality of position dependent gain values.

20. The imaging apparatus according to claim 14 wherein the means for creating the boost map includes defining a region surrounding each edge position of the test pattern image, and repeating the calculated boost value for each corresponding region to produce the plurality of position dependent gain values.

21. The imaging apparatus according to claim 14 wherein the light-sensitive medium is a photographic film, the imaging section produces an image on the photographic film, and the boost map is stored as a code that is accessible during processing of the film to correct for the position dependent blur of the captured image.

22. The imaging apparatus according to claim 21 wherein the code is recorded on the film.

23. The imaging apparatus according to claim 22 wherein the film includes a magnetic region and the code is recorded on the magnetic region.

24. The imaging apparatus according to claim 14 wherein the light-sensitive medium is an electronic image sensor and an image is captured by the electronic image sensor which produces digital image signals corresponding to pixels in the captured image.

25. The imaging apparatus according to claim 24 further comprising means for storing the boost values.

26. The imaging apparatus according to claim 25 wherein the number of calculated boost values is less than the number of pixels in the captured image.

* * * * *